(12) United States Patent
Nelson

(10) Patent No.: US 9,994,756 B2
(45) Date of Patent: Jun. 12, 2018

(54) SEGREGATING FLUIDS, METHODS OF MAKING, AND METHODS OF USE

(71) Applicant: Scott Gregory Nelson, Cypress, TX (US)

(72) Inventor: Scott Gregory Nelson, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 242 days.

(21) Appl. No.: 14/643,152

(22) Filed: Mar. 10, 2015

(65) Prior Publication Data
US 2016/0264837 A1   Sep. 15, 2016

(51) Int. Cl.
| C09K 8/12 | (2006.01) |
| E21B 33/13 | (2006.01) |
| C09K 8/40 | (2006.01) |
| E21B 21/00 | (2006.01) |
| C09K 8/42 | (2006.01) |

(52) U.S. Cl.
CPC .............. *C09K 8/12* (2013.01); *C09K 8/40* (2013.01); *C09K 8/424* (2013.01); *E21B 21/00* (2013.01); *E21B 33/13* (2013.01)

(58) Field of Classification Search
CPC ....................................................... C09K 8/40
See application file for complete search history.

(56) References Cited

U.S. PATENT DOCUMENTS

| 2,854,407 | A | * | 9/1958 | Mallory ................. C09K 8/206 |
| | | | | 210/730 |
| 3,820,602 | A | | 6/1974 | Motley et al. |
| 3,850,248 | A | | 11/1974 | Carney |
| 5,101,902 | A | * | 4/1992 | Parcevaux ............... C09K 8/40 |
| | | | | 166/291 |
| 5,866,517 | A | | 2/1999 | Carpenter et al. |
| 6,059,034 | A | | 5/2000 | Rickards et al. |
| 6,330,916 | B1 | | 12/2001 | Rickards et al. |
| 6,364,018 | B1 | | 4/2002 | Brannon et al. |
| 7,426,961 | B2 | | 9/2008 | Stephenson et al. |
| 9,650,559 | B2 | | 5/2017 | Nelson |
| 2001/0002224 | A1 | | 5/2001 | Sasaki et al. |
| 2005/0230116 | A1 | * | 10/2005 | Eoff .......................... C09K 8/40 |
| | | | | 166/305.1 |
| 2006/0185848 | A1 | | 8/2006 | Surjaatmadja et al. |
| 2006/0213662 | A1 | | 9/2006 | Creel et al. |
| 2007/0068675 | A1 | | 3/2007 | Barry et al. |
| 2009/0095475 | A1 | | 4/2009 | Ravi et al. |
| 2010/0204069 | A1 | | 8/2010 | Le et al. |
| 2011/0094746 | A1 | | 4/2011 | Allison et al. |
| 2011/0303415 | A1 | | 12/2011 | Todd et al. |
| 2012/0103610 | A1 | | 5/2012 | Turner et al. |
| 2012/0305250 | A1 | | 12/2012 | Burts et al. |
| 2013/0000900 | A1 | | 1/2013 | Kalgaonkar et al. |
| 2013/0341025 | A1 | | 12/2013 | Gupta |
| 2014/0024561 | A1 | | 1/2014 | Reddy |
| 2014/0332213 | A1 | | 11/2014 | Zhou et al. |
| 2016/0264838 | A1 | | 9/2016 | Nelson |

FOREIGN PATENT DOCUMENTS

| WO | 2007082207 | | 7/2007 |
| WO | 2010027366 | A1 | 3/2010 |
| WO | 2010094932 | A1 | 8/2010 |
| WO | 2012162117 | | 11/2012 |
| WO | 2014004611 | A2 | 1/2014 |

OTHER PUBLICATIONS

Bishop, et al., "A Robust, Field Friendly, Cement Spacer System" Drilling Specialties Company, ConocoPhillips Company; AADE Fluids Conference and Exhibition held in Houston, TX, Apr. 8-9, 2008; 5 pages.
Hannah, R.R. et al., "The Real-Time Calculation of Accurate Bottomhole Fracturing Pressure From Surface Measurements Using Measured Pressures as a Base", SPE 12062 (1983); 12 pages.
International Search Report and Written Opinion, Internation Aplication No. PCT/US2016/020428, dated Jun. 15, 2016; International Search Report 5 pages; Written Opinion 6 pages.
Jacot, et al., "Technology Integration—A Methodology to Enhance Production and Maximize Economics in Horizontal Marcellus Shale Wells", SPE 135262 (2010); 28 pages.
Yeager et al., "Injection/Fall-off Testing in the Marcellus Shale: Using Reservoir Knowledge to Improve Operational Efficiency", SPE 139067 (2010); 19 pages.
U.S. Non-Final Office Action, Issued in U.S. Appl. No. 14/643,138, dated Jul. 1, 2016, U.S. Patent Office; Office Action 6 pages.
U.S. Non-Final Office Action, Issued in U.S. Appl. No. 14/643,117, dated Jan. 17, 2017, U.S. Patent Office; Office Action 16 pages.
U.S. Final Office Action, Issued in U.S. Appl. No. 14/643,117, dated Jul. 27, 2017, U.S. Patent Office; Office Action 14 pages.

\* cited by examiner

*Primary Examiner* — William D Hutton, Jr.
*Assistant Examiner* — Avi Skaist
(74) *Attorney, Agent, or Firm* — Cantor Colburn LLP

(57) ABSTRACT

A segregating fluid for use in a wellbore includes an aqueous segregating carrier fluid; and a preformed synthetic polymer swellable in the aqueous segregating carrier fluid in an amount effective to segregate a first fluid from a second fluid in a wellbore.

19 Claims, No Drawings

SEGREGATING FLUIDS, METHODS OF MAKING, AND METHODS OF USE

BACKGROUND

This disclosure relates to segregating fluids for use in wellbores, methods for their manufacture, and methods of use.

Drilling fluids (or "muds") used in the drilling of subterranean oil and gas wells and other drilling applications are well known. Drilling fluids carry cuttings and other particulates from beneath the bit, transport them through the annulus, and allow their separation at the surface while at the same time the rotary bit is cooled and cleaned. A drilling fluid is also intended to reduce friction between the drill string and the sides of the hole while maintaining the stability of uncased sections of the borehole. The drilling fluid is formulated to prevent unwanted influxes of formation fluids from permeable rocks penetrated. The drilling fluid may also be used to collect and interpret information available from drill cuttings, cores and electrical logs. It will be appreciated that as used herein, the term "drilling fluid" also encompasses "drill-in fluids" and "completion fluids."

A spacer fluid, in contrast, is a liquid used to physically separate one special-purpose liquid from another during a drilling operation. Special-purpose liquids are subject to contamination, for example from the drilling fluid or the wellbore, so a spacer fluid compatible with each is used between the two. For example, a spacer fluid separates drilling fluid from the cement slurry during cementing operations. For cementing, an aqueous spacer or sequence of spacers usually separates the drilling fluid from the cement slurry subsequently pumped downhole. Current industry techniques utilize a design of spacer systems commonly composed of sequences of spacer fluids, for example one or more turbulent spacers, with increasing densities above that of the drilling fluid that is being displaced from the well bore, and less dense than the cement slurry. Such spacer combinations can be referred to as a "spacer train."

Even with the use of spacer fluids, however, contamination between the various fluids can still occur, particularly at the leading edge of the following fluid. Contamination is particularly problematic where the two fluids have a different viscosity, density, or both. Drilling fluids are especially prone to being incompletely removed. Some spacer fluids are unstable under operating conditions, especially at higher temperatures as they can exist at the bottom of a wellbore. Accordingly, there remains a need in the art for improved methods for preventing contamination between sequentially pumped fluids in a wellbore, especially during cementing operations. In particular, a need remains for improved methods to effectively remove drilling fluids from wellbores.

BRIEF DESCRIPTION

Described herein is a segregating fluid for use in a wellbore, comprising an aqueous segregating carrier fluid; and a preformed synthetic polymer swellable in the aqueous segregating carrier fluid in an amount effective to segregate a first fluid from a second fluid in a wellbore.

Another embodiment is a method of segregating a first fluid from a second fluid in a wellbore during cementing, the method comprising injecting into the wellbore a first fluid; injecting into the wellbore the segregating fluid described herein to contact the first fluid; and injecting into the wellbore a second fluid to contact the segregating fluid.

In another embodiment, a method of removing an aqueous drilling fluid from a wellbore containing the aqueous drilling fluid comprises injecting into the wellbore the segregating fluid described herein to contact the aqueous drilling fluid and to flocculate a solid in the aqueous drilling fluid; and removing the flocculated aqueous drilling fluid from the wellbore.

DETAILED DESCRIPTION

A detailed description of one or more embodiments is presented herein by way of exemplification and not limitation.

An improved method of segregating fluids, and thus preventing fluid contamination in a wellbore, uses a segregating fluid comprising a preformed synthetic polymer stable at high temperatures. It has been discovered by the inventors hereof that use of the preformed synthetic polymer in the segregating fluid allows improved stability of the system and improved segregation of cement spacer fluids, drilling fluids, and cement slurries. The segregating fluid can efficiently reduce or eliminate mixing of fluids within the wellbore during cementing operations, particularly at the leading edge of the following fluid. Without being bound by theory, it is believed that the preformed synthetic polymer utilizes a novel particle packing mode approach to create a cementing spacer system that does not follow the conventional rules within the art of cementing. In the presence of an aqueous carrier fluid, absorption of water causes the preformed synthetic polymer to swell, and in some embodiments, agglomerate to a hydrated pack of swelled polymer. The inventors hereof have discovered that the presence of the swelled polymer aids in separating fluids by preventing the fluids from blending at their interface while being pumped. This capability is especially important for the removal of drilling mud and the like from vertical and horizontal wellbores.

In a further advantageous feature, the segregating fluids can improve the removal of drilling fluids from the well bore. Again without being bound by theory, it is believed that the presence of the preformed synthetic polymer aids in the flocculation of solids contained in water-based drilling muds, and thus more complete removal of the drilling fluids.

In general, a method of segregating a first fluid from a second fluid in a wellbore includes injecting into the wellbore a first fluid, injecting into the wellbore a segregating fluid to contact the first fluid, and injecting into the wellbore a second fluid to contact the segregating fluid. The first and the second fluids can be the same or different. The method is particularly useful in cementing operations. For example, in some embodiments of the method of segregating fluids in a wellbore, the segregating fluid is used to separate the drilling fluid from the cement spacer fluid and/or cement slurry. When the drilling fluids are separated from the cement spacer fluid and/or cement slurry by the segregating fluid, they can be removed from the wellbore with less contamination of the following fluids.

The segregating fluid comprises an aqueous segregating carrier fluid and the preformed synthetic polymer. The preformed synthetic polymer can be swellable in the aqueous segregating carrier fluid. The polymer can be present in the carrier fluid in any form, including particulate. The shape of the polymer particles is not critical, and can be regular or irregular, for example spherical, ovoid, polyhedral, or fibrous, stranded, or braided. In an embodiment, the polymer particles are in the form of beads having an approximately spherical shape. The particles can further have pores or spaces between the polymer chains that admits entrance of a fluid or other particles therein. The shape, size, and size distribution of the polymer particles in the carrier fluid should be effective to provide efficient displacement of the drilling fluids, and preferably selected to improve suspension of contaminant particulates in the segregating fluid. For example, unswelled particles can have an average largest diameter of about 150 to about 1,000 micrometers, preferably about 250 to about 800 micrometers. The unswelled polymer particles (e.g. dry particles) are in general swellable. Swelling leads to an increase in average largest diameter of the particles. This particle swellability can be about 1 to about 20 times, or about 1 to about 15 times, about 1.5 to about 10 times, based on average largest diameter of a swelled polymer particle relative to average largest diameter of the same particle without swelling. In a non-limiting example, a dry polymer particle having an average largest diameter of about 200 micrometer can swell to a swelled polymer particle with an average largest diameter of about 2,000 micrometers.

In some embodiments, at least about 60%, preferably at least about 80%, more preferably at least about 95% of the swelled polymer particles in the cement spacer fluid can have an average largest diameter of about 0.01 to about 100,000 micrometers, preferably about 0.1 to about 50,000 micrometers, or about 1 about 1 to about 20,000 micrometers more preferably about 1 about 100 to about 50,000 micrometers, about 500 to about 2,000 micrometers, or about 2,000 to about 8,000 micrometers. In other embodiments, at least about 95% of the polymer particles in the cement spacer fluid can have an average largest diameter of about 100 to about 15,000 micrometers, more preferably about 500 to about 12,000 micrometers. At least about 90% of the polymer particles can have an average largest diameter of about 1 to about 20,000 micrometers, preferably about 100 to about 15,000 micrometers, more preferably about 500 to about 10,000 micrometers. At least about 75% of the polymer particles can have an average largest diameter of about 100 to about 15,000 micrometers, preferably about 500 to about 12,000 micrometers, preferably about 1,000 to about 10,000 micrometers. At least about 50% of the polymer particles can have an average largest diameter of about 500 to about 12,000 micrometers, preferably about 1,000 to about 10,000 micrometers, preferably about 2,000 to about 8,000 micrometers. At least about 30% of the polymer particles can have an average largest diameter of about 1,000 to about 10,000 micrometers, preferably about 2,000 to about 8,000 micrometers, more preferably about 2,500 to about 7,000 micrometers.

The preformed synthetic polymer can be present in the aqueous segregating carrier fluid in an amount effective to segregate the first and the second fluid. For example, the polymer can be present in the carrier fluid in a concentration of about 0.1 to about 200 pounds per thousand gallons, preferably about 0.5 about 1 to about 100 pounds per thousand gallons, more preferably about 1 to about 75 pounds per thousand gallons.

The preformed synthetic polymer can be a superabsorbent polymer (SAP), which as used herein is a crosslinked, neutral, neutralized or partially neutralized polymer that is capable of absorbing large amounts of aqueous liquids, such as water, brine, acid, or base, with swelling and the formation of a gel or viscous material, and that retains the absorbed fluid under a certain pressure or temperature. The superabsorbent polymer can have internal crosslinks, surface crosslinks, or a combination comprising at least one of the foregoing. Superabsorbent polymer particles are particles of superabsorbent polymers or superabsorbent polymer compositions. The acronym SAP may be used in place of superabsorbent polymer, superabsorbent polymer composition, and particles or fibers (and the like) herein.

The SAP comprises a hydrophilic network that retains large amounts of aqueous liquid relative to the weight of the SAP (e.g., in a dry state, the SAP absorbs and retains a weight amount of water equal to or greater than its own weight). The SAPs can be a variety of synthetic organic polymers that react with or absorb water and swell when contacted with an aqueous fluid. Non-limiting examples of such SAPs are poly(hydroxyC$_{1-8}$ alkyl (meth)acrylate)s such as (2-hydroxyethyl acrylate), poly(meth)acrylamide, poly (vinyl pyrrolidine), poly(vinyl acetate), and the like. The foregoing are inclusive of copolymers, for example copolymers of (meth)acrylamide with maleic anhydride, vinyl acetate, ethylene oxide, ethylene glycol, or acrylonitrile, or a combination comprising at least one of the foregoing. A combination of different polymers can be used.

The preformed synthetic polymers are polymerized from nonionic, anionic, cationic monomers, or a combination comprising at least one of the foregoing. Polymerization can be via free-radical polymerization, solution polymerization, gel polymerization, emulsion polymerization, dispersion polymerization, or suspension polymerization. Moreover, polymerization can be performed in an aqueous phase, in inverse emulsion, or in inverse suspension.

Examples of nonionic monomers for preparing the preformed synthetic polymers include (meth)acrylamide, alkyl-substituted (meth)acrylamides, aminoalkyl-substituted (meth)acrylamides, alkyliminoalkyl-substituted (meth)acrylamides, vinyl alcohol, vinyl acetate, allyl alcohol, C$_{1-8}$ alkyl (meth)acrylates, hydroxyC$_{1-8}$ alkyl (meth)acrylates such as hydroxyethyl (meth)acrylate, N-vinylformamide, N-vinylacetamide, and (meth)acrylonitrile. As used herein, "poly ((meth)acrylamide)s" includes polymer comprising units derived from (meth)acrylamide, alkyl-substituted (meth) acrylamides such as N—C$_{1-8}$ alkyl (meth)acrylamides and N,N-di(C$_{1-8}$ alkyl) (meth)acrylamides, aminoalkyl-substituted (meth)acrylamides such as N,N-di(amino(C$_{1-8}$ alkyl))-substituted (meth)acrylamides, and (N,N-dialkylamino) alkyl-substituted (meth)acrylamides such as (N,N-di(C$_{1-8}$ alkyl)amino)(C$_{1-8}$ alkyl) (meth)acrylamides. Specific examples of the foregoing monomers include methacrylamide, N-methyl acrylamide, N-methyl methacrylamide, N,N-dimethyl acrylamide, N-ethyl acrylamide, N,N-diethyl acrylamide, N-cyclohexyl acrylamide, N-benzyl acrylamide, N,N-dimethylaminopropyl acrylamide, N,N-dimethylaminoethyl acrylamide, N-tert-butyl acrylamide, or a combination comprising at least one of the foregoing can be used. In an embodiment, the poly((meth)acrylamide) is a copolymer of methacrylamide with maleic anhydride, vinyl acetate, ethylene oxide, ethylene glycol, or acrylonitrile, or a combination comprising at least one of the foregoing.

Examples of anionic monomers include ethylenically unsaturated anionic monomers having acidic groups, for example, a carboxylic group, a sulfonic group, a phosphonic group, a salt thereof, the corresponding anhydride or acyl halide, or a combination comprising at least one of the foregoing acidic groups. For example, the anionic monomer can be (meth)acrylic acid, ethacrylic acid, maleic acid, maleic anhydride, fumaric acid, itaconic acid, α-chloroacrylic acid, β-cyanoacrylic acid, β-methylacrylic acid, α-phenylacrylic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulfonic acid, allyl sulfonic acid, vinyl sulfonic acid, allyl phosphonic acid, vinyl phosphonic acid, or a combination comprising at least one of the foregoing can be used.

Examples of cationic monomers include (N,N-di($C_{1-8}$alkylamino)($C_{1-8}$alkyl) (meth)acrylates (e.g., N,N-dimethylaminoethyl acrylate and N,N-dimethylaminoethyl methacrylate), (wherein the amino group is quaternized to, e.g., a methyl chloride quaternary form), diallyldimethyl ammonium chloride, or any of the foregoing alkyl-substituted (meth)acrylamides and dialkylaminoalkyl-substituted (meth)acrylamides, such as (N,N-di($C_{1-8}$alkyl)amino)$C_{1-8}$alkyl acrylamide, and the quaternary forms thereof such as acrylamidopropyl trimethyl ammonium chloride.

In an embodiment, the preformed synthetic polymer is amphoteric, containing both cationic substituents and anionic substituents. The cationic substituents and anionic substituents occur in various stoichiometric proportions, for example, a ratio of 1 about 1:1, or one monomer can be present in a greater stoichiometric amount than the other monomer. Representative amphoteric polymers include terpolymers of nonionic monomers, anionic monomers and cationic monomers.

The preformed synthetic polymer can include a plurality of crosslinks among the polymer chains of the polymer. The crosslinks can be covalent and result from crosslinking the polymer chains using a crosslinker. The crosslinker can be an ethylenically-unsaturated monomer that contains, for example, two sites of ethylenic unsaturation (i.e., two ethylenically unsaturated double bonds), an ethylenically unsaturated double bond and a functional group that is reactive toward a functional group (e.g., an amide group) of the polymer chains of the polymer, or several functional groups that are reactive toward functional groups of the polymer chains of the polymer. The degree of crosslinking can be selected so as to control the amount of swelling of the polymer. For example, the degree of crosslinking can be used to control the amount of fluid absorption or the volume expansion of the polymer.

Exemplary crosslinkers include a diacrylamide or methacrylamide of a diamine such as a diacrylamide of piperazine; an acrylate or methacrylate ester of a di, tri, tetrahydroxy compound including ethyleneglycol diacrylate, polyethyleneglycol diacrylate, trimethylolpropane trimethacrylate, ethoxylated trimethylol triacrylate, ethoxylated pentaerythritol tetracrylate, and the like; a divinyl or diallyl compound separated by an azo group such as a diallylamide of 2,2'-azobis(isobutyric acid) or a vinyl or allyl ester of a di or tri functional acid. Additional crosslinkers include water-soluble diacrylates such as poly(ethylene glycol) diacrylate (e.g., PEG 200 diacrylate) or PEG 400 diacrylate and polyfunctional vinyl derivatives of a polyalcohol such as ethoxylated (9-20) trimethylol triacrylate. Further examples of the crosslinker include aliphatic unsaturated amides, such as methylenebisacrylamide or ethylenebisacrylamide; aliphatic esters of polyols or alkoxylated polyols with ethylenically unsaturated acids, such as di(meth)acrylates or tri(meth)acrylates of butanediol, ethylene glycol, polyglycols, trimethylolpropane; di- and triacrylate esters of trimethylolpropane (which is oxyalkylated (such as ethoxylated) with an alkylene oxide such ethylene oxide); acrylate and methacrylate esters of glycerol or pentaerythritol; acrylate and methacrylate esters of glycerol and pentaerythritol oxyethylated with, e.g., ethylene oxide; allyl compounds (such as allyl(meth)acrylate, alkoxylated allyl(meth)acrylate reacted with, e.g., ethylene oxide, triallyl cyanurate, triallyl isocyanurate, maleic acid diallyl ester, poly-allyl esters, tetraallyloxyethane, triallylamine, tetraallylethylenediamine, diols, polyols, hydroxy allyl or acrylate compounds and allyl esters of phosphoric acid or phosphorous acid); or monomers that are capable of crosslinking, such as N-methylol compounds of unsaturated amides, such as of methacrylamide or acrylamide, and the ethers derived therefrom. A combination of the crosslinkers also can be employed.

When the preformed synthetic polymer is in the form of a particle, the particle can includes surface crosslink external to the interior of the particle. The surface crosslinks can result from addition of a surface crosslinker to the superabsorbent polymer particle and subsequent heat treatment. The surface crosslinks can increase the crosslink density of the particle near its surface with respect to the crosslink density of the interior of the particle. Surface crosslinkers can also provide the particle with a chemical property that the superabsorbent polymer did not have before surface crosslinking, and can control the chemical properties of the particle, for example, hydrophobicity, hydrophilicity, and adhesiveness of the superabsorbent polymer to other materials, for example, minerals (e.g., silicates) or other chemicals, for example, petroleum compounds (e.g., hydrocarbons, asphaltene, and the like).

Surface crosslinkers have at least two functional groups that are reactive with a group of the polymer chains, for example, any of the above crosslinkers, or crosslinkers having reactive functional groups such as an acid (including carboxylic, sulfonic, and phosphoric acids and the corresponding anions), an amide, an alcohol, an amine, or an aldehyde. Exemplary surface crosslinkers include polyols, polyamines, polyaminoalcohols, and alkylene carbonates, such as ethylene glycol, diethylene glycol, triethylene glycol, polyethylene glycol, glycerol, polyglycerol, propylene glycol, diethanolamine, triethanolamine, polypropylene glycol, block copolymers of ethylene oxide and propylene oxide, sorbitan fatty acid esters, ethoxylated sorbitan fatty acid esters, trimethylolpropane, ethoxylated trimethylolpropane, pentaerythritol, ethoxylated pentaerythritol, polyvinyl alcohol, sorbitol, ethylene carbonate, propylene carbonate, and combinations comprising at least one of the foregoing.

Additional surface crosslinkers include borate, titanate, zirconate, aluminate, chromate, or a combination comprising at least one of the foregoing. Boron crosslinkers include boric acid, sodium tetraborate, encapsulated borates, and the like. Borate crosslinkers can be used with buffers and pH control agents including sodium hydroxide, magnesium oxide, sodium sesquicarbonate, and sodium carbonate, amines (such as hydroxyalkyl amines, anilines, pyridines, pyrimidines, quinolines, pyrrolidines, and carboxylates such as acetates and oxalates), delay agents including sorbitol, aldehydes, sodium gluconate, and the like. Zirconium crosslinkers, e.g., zirconium lactates (e.g., sodium zirconium lactate), triethanolamines, 2,2'-iminodiethanol, or a combination comprising at least one of the foregoing can be used. Titanates crosslinkers can include, for example, lactates, triethanolamines, and the like.

The preformed synthetic polymer can include repeat units comprising an acrylate, an acrylamide, a vinylpyrrolidone, a vinyl ester (e.g., a vinyl acetate), a vinyl alcohol, a derivative thereof, or a combination comprising at least one of the foregoing. According to an embodiment, the preformed synthetic polymer can comprise polyacrylamide having crosslinks derived from polyethylene glycol diacrylate. In some embodiments, the superabsorbent polymer comprises polyacrylic acid, wherein the crosslinks are derived from a vinyl ester oligomer. In another embodiment, the superabsorbent polymer is a poly(acrylic acid) partial sodium salt-graft-poly(ethylene glycol), which is commercially available from Sigma Aldrich.

In addition to the preformed synthetic polymer, the polymer particles can further comprise a swellable natural polymer, e.g., a natural polysaccharide such as guar, carrageenan, starch, cellulose, xanthan gum, agar, pectin, alginic acid, tragacanth gum, pluran, gellan gum, tamarind seed gum, cardlan, gum arabic, glucomannan, chitin, chitosan, hyaluronic acid, and the like. The natural polysaccharides, when included in the particles, can aid in the hydration of the synthetic polymer. Alternatively, or in addition, the natural polymer can function as a friction reducer. Thus, the natural polymer can be included as a component of the segregating fluid, that is, added separately from the synthetic particles. The weight ratio of preformed synthetic polymer to natural polymer, e.g., guar gum or carrageen can be about 99:1 to about 80:20, for example 97:3 to about 85:15, preferably about 95:5 to about 90:1

In an embodiment, the natural polymer is a guar gum or carrageenan as disclosed, for example, in Japanese Patent Application No. P2003-154262A. The guar gum can be a natural guar gum or an enzyme treated guar gum obtained by treating natural guar gum with galactosidase, mannosidase, or another enzyme. The guar gum may further be a galactomannan derivative prepared by treating natural guar gum with chemicals to introduce carboxyl groups, hydroxyl alkyl groups, sulfate groups, phosphate groups, and the like. Carrageenan is an ionic linear polysaccharide that includes repeating galactose units that individually can be sulfated or unsulfated. Specific carrageenan types include kappa, iota, lambda, and the like. In some embodiments, a mixture of carrageenan types is used. In a specific embodiment, a carrageenan or a carrageenan-like material that forms a gel is used. In addition to natural carrageenan, suitable carrageenans include enzyme-treated substances of natural carrageenan or derivatized carrageenan, e.g., those prepared by treating natural carrageenan (e.g., with a chemical) to introduce a functional group (e.g., a carboxyl group, hydroxyl alkyl group, sulfate group, phosphate group, and the like).

The segregating fluid further comprises an aqueous segregating carrier fluid to carry the preformed synthetic polymer to the desired location in the well borehole formation and to swell the polymer. The aqueous carrier fluid can be fresh water, brine (including seawater), an aqueous acid (for example a mineral acid or an organic acid), an aqueous base, or a combination comprising at least one of the foregoing. It will be appreciated that other polar liquids such as alcohols and glycols, alone or together with water, may be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from the ground. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as about 1 to about 0.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The salt can be present in the brine in an amount of about 0.5 to about 50 weight percent (wt. %), specifically about 1 to about 40 wt. %, and more specifically about 1 to about 25 wt %, based on the weight of the fluid.

The aqueous carrier fluid can be an aqueous mineral acid that includes hydrochloric acid, nitric acid, phosphoric acid, sulfuric acid, boric acid, hydrofluoric acid, hydrobromic acid, perchloric acid, or a combination comprising at least one of the foregoing. The fluid can be an aqueous organic acid that includes a carboxylic acid, sulfonic acid, or a combination comprising at least one of the foregoing. Exemplary carboxylic acids include formic acid, acetic acid, chloroacetic acid, dichloroacetic acid, trichloroacetic acid, trifluoroacetic acid, propionic acid, butyric acid, oxalic acid, benzoic acid, phthalic acid (including ortho-, meta- and para-isomers), and the like. Exemplary sulfonic acids include a $C_{1-20}$ alkyl sulfonic acid, wherein the alkyl group can be branched or unbranched and can be substituted or unsubstituted, or a $C_{3-20}$ aryl sulfonic acid wherein the aryl group can be monocyclic or polycyclic, and optionally comprises 1 to 3 heteroatoms (e.g., N, S, or P). Alkyl sulfonic acids can include, for example, methane sulfonic acid. Aryl sulfonic acids can include, for example, benzene sulfonic acid or toluene sulfonic acid. In some embodiments, the aryl group can be $C_{1-20}$ alkyl-substituted, i.e., is an alkylarylene group, or is attached to the sulfonic acid moiety via a $C_{1-20}$ alkylene group (i.e., an arylalkylene group), wherein the alkyl or alkylene can be substituted or unsubstituted.

The segregating fluids can further comprise other components known for use in segregating fluids for use in wellbores, for example a viscosifier, a viscosifier crosslinker, a pH control agent, a surfactant, a weighting agent, a lubricant, a fluid loss agent, a clay stabilizer, a biocide, an acid, a corrosion inhibitor, an oxygen scavenger, or a combination comprising at least one of the foregoing. These additional components are selected so as to avoid imparting unfavorable characteristics to the segregating fluid, to avoid damage to equipment in contact with the segregating fluid, and to avoid damaging the wellbore or subterranean formation.

The viscosifier can be a natural polymers such as guar gums, guar derivatives such as hydropropyl guar (HPG), carboxymethyl guar (CMG), and carboxymethylhydroxypropyl guar (CMHPG), high-molecular weight, hydratable polysaccharides, xanthan gum (which can optionally be crosslinked), galactomannan gums, glucomannan gums, cellulose, cellulose derivatives such as hydroxyethylcellulose (HEC), carboxymethylcellulose (CMC), hydroxypropylcellulose (HPC), and carboxymethylhydroxyethylcellulose (CMHEC); synthetic polymers such as poly((meth)acrylic acid)s, poly((meth)acrylamides), copolymers of (meth)acrylic acid and (meth)acrylamide, and C1-8 alkyl poly (meth)acrylates; or clays such as bentonite, sepiolite, and attapulgite, and the like; or a combination comprising at least one of the foregoing viscosifiers.

The viscosifier forms a viscous gel upon contact with the fluid of the segregating fluid (or other fluid such as water, brine, or other downhole fluid). In some embodiments, a combination of fluids is used to form the segregating fluid, a first fluid to swell the preformed synthetic polymer and a second fluid to gel the segregating fluid. Without being bound by theory, the presence of a viscosifier in the segregating fluid increases the viscosity, thus the particle-suspension ability of the composition, and reduces the friction pressure. When the segregating fluid is a fluid foam, the viscosifier can further stabilize the foam. Selection of the preformed synthetic polymer and the viscosifier allow manufacture of segregating fluid having beneficial rheological properties including tunable viscosity and breaking properties.

In an embodiment, a crosslinker for the viscosifier can be present, for example a borate, titanate, zirconate, aluminate, or chromate crosslinker as described above, or a combination comprising at least one of the foregoing.

The pH-adjusting agent is an organic or inorganic base, organic or inorganic acid, or a buffer, which is any appropriate combination of acid and conjugate base. Exemplary inorganic bases include those represented by MOH, where M is a metal from group 1 or 2 of the periodic table, a transition metal, or a metal or metalloid from group 13, 14, or 15; carbonate salt; bicarbonate salt; or a combination comprising at least one of the foregoing. Exemplary inorganic acids include HCl, HBr, fluoroboric acid, sulfuric acid, nitric acid, acetic acid, formic acid, methanesulfonic acid, propionic acid, chloroacetic or dichloroacetic acid, citric acid, glycolic acid, lactic acid, or a combination comprising at least one of the foregoing. Specific examples of pH control agents, particularly those used in combination with borate crosslinking agents include alkaline metal and alkaline earth metal hydroxides and carbonates such as sodium hydroxide and sodium carbonate, metal oxides such as magnesium oxide, sodium sesquicarbonate, and amines such as hydroxyalkyl amines, anilines, pyridines, pyrimidines, quinolines, and pyrrolidines, and carboxylates such as acetates and oxalates.

Surfactants can increase the compatibility of the segregating fluid and the drilling fluid, cement spacer, and/or cement slurry. The surfactant can be anionic, cationic, zwitterionic, or non-ionic. Other useful surfactants include those having poly(alkylene glycol) side chains, fatty acids, or fluorinated groups such as perfluorinated $C_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones.

Exemplary cationic surfactants include $C_{1-18}$ alkyl primary, secondary, and tertiary amines, alkanolamides, quaternary ammonium salts, alkylated imidazolium, and pyridinium salts. Additional examples of the cationic surfactant include primary to tertiary alkylamine salts such as, e.g., monostearylammonium chloride, distearylammonium chloride, tristearylammonium chloride; quaternary alkylammonium salts such as, e.g., monostearyltrimethylammonium chloride, distearyldimethylammonium chloride, stearyldimethylbenzylammonium chloride, monostearyl-bis(polyethoxy)methylammonium chloride; alkylpyridinium salts such as, e.g., N-cetylpyridinium chloride, N-stearylpyridinium chloride; N,N-dialkylmorpholinium salts; fatty acid amide salts such as, e.g., polyethylene polyamine; and the like.

Exemplary anionic surfactants include $C_{1-60}$ carboxylates, $C_{1-20}$ alkyl sulfates, $C_{1-20}$ alkyl sulfonates, fatty acids, sulfosuccinates, $C_{1-20}$ phosphonates, or mono- or di-($C_{1-20}$ alkyl) phosphate esters. Examples of an anionic surfactant include anionic surfactants having a carboxyl group such as a sodium, potassium, or ammonium salt of a ($C_{1-20}$ alkyl) carboxylic acid, a sodium, potassium, or ammonium salt of a ($C_{7-20}$ alkylbenzene)carboxylic acid, a sodium, potassium, or ammonium salt of a poly(oxy($C_{1-4}$ alkylene) ($C_{1-12}$alkyl) ether carboxylic acid, a sodium, potassium, or ammonium salt of salt of N-acylsarcosine acid, a sodium, potassium, or ammonium salt of N-acylglutamic acid, and the like.

Nonionic surfactants can be, for example, esters and polyesters of fatty acids of up to about 22 carbon atoms such as stearic acids, poly(alkylene glycols) such as poly(ethylene oxide), poly(propylene oxide), and block and random poly(ethylene oxide-propylene oxide) copolymers such as those marketed under the trademark PLURONIC by BASF. Other surfactants include polysiloxanes, such as homopolymers or copolymers of poly(dimethylsiloxane), including those having functionalized end groups, and the like, ethoxylated fatty alcohols, alkyl phenol polyethoxylates, glycerol esters, glycol esters, polyethers, alkyl polyglycosides, amineoxides, or a combination comprising at least one of the foregoing. Specific examples of nonionic surfactants include fatty alcohols (e.g., cetyl alcohol, stearyl alcohol, cetostearyl alcohol, oleyl alcohol, and the like); polyoxyethylene glycol alkyl ethers (e.g., octaethylene glycol monododecyl ether, pentaethylene glycol monododecyl ether, and the like); polyoxypropylene glycol alkyl ethers (e.g., butapropylene glycol mononyl ethers); glucoside alkyl ethers (e.g., decyl glucoside, lauryl glucoside, octyl glucoside); polyoxyethylene glycol octylphenol ethers (e.g., Triton X-100 (octyl phenol ethoxylate)); polyoxyethylene glycol alkylphenol ethers (e.g., nonoxynol-9); glycerol alkyl esters (e.g., glyceryl laurate); polyoxyethylene glycol sorbitan alkyl esters (e.g., polysorbates such as sorbitan monolaurate, sorbitan monopalmitate, sorbitan monostearate, sorbitan tristearate, sorbitan monooleate, and the like); sorbitan alkyl esters (e.g., polyoxyethylene sorbitan monolaurate, polyoxyethylene sorbitan monopalmitate, polyoxyethylene sorbitan monostearate, polyoxyethylene sorbitan monooleate, and the like); cocamide ethanolamines (e.g., cocamide monoethanolamine, cocamide diethanolamine, and the like); amine oxides (e.g., dodecyldimethylamine oxide, tetradecyldimethylamine oxide, hexadecyl dimethylamine oxide, octadecylamine oxide, and the like); polyethoxylated amines (e.g., polyethoxylated tallow amine); polyoxyethylene alkyl ethers such as polyoxyethylene stearyl ether; polyoxyethylene alkylene ethers such as polyoxyethylene oleyl ether; polyoxyalkylene alkylphenyl ethers such as polyoxyethylene nonylphenyl ether; polyoxyalkylene glycols such as polyoxypropylene polyoxyethylene glycol; polyoxyethylene monoalkylates such as polyoxyethylene monostearate; bispolyoxyethylene alkylamines such as bispolyoxyethylene stearylamine; bispolyoxyethylene alkylamides such as bispolyoxyethylene stearylamide; alkylamine oxides such as N,N-dimethylalkylamine oxide; and the like.

Zwitterionic surfactants (which include a cationic and anionic functional group on the same molecule) include, e.g., betaines, such as alkyl ammonium carboxylates (e.g., $(CH_3)_3N^+CH(R)COO^-$ or sulfonates (sulfo-betaines) such as $RN^+(CH_3)_2(CH_2)_3SO_3^-$, where R is an alkyl group. Examples include n-dodecyl-N-benzyl-N-methylglycine $[C_{12}H_{25}N^+(CH_2C_6H_5)(CH_3)CH_2COO^-]$, N-allyl N-benzyl N-methyltaurines $[C_nH_{2n+1}N^+(CH_2C_6H_5)(CH_3)CH_2CH_2SO_3^-]$.

In an embodiment, the surfactant is a viscoelastic surfactant capable of forming viscoelastic fluids at a lower concentration. This specific rheological behavior is mainly due to the types of surfactant aggregates that are present in the fluids. In low viscosity fluids, the surfactant molecules aggregate in spherical micelles whereas, in viscoelastic fluids, long micelles, which can be described as worm-like, thread-like or rod-like micelles, are present and entangle. Viscoelastic surfactants are usually ionic, including cationic, anionic, or zwitterionic. When the surfactant is cationic, it is associated with a negative counterion, which can be an inorganic anion such as a sulfate, a nitrate, a perchlorate or a halide such as Cl$^-$, Br$^-$, or with an aromatic organic anion such as salicylate, naphthalene sulfonate, p and m chlorobenzoates, 3,5-, 3,4-, and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate. When the surfactant is anionic, it is associated with a positive counterion, for example, Na$^+$ or K$^+$. When it is zwitternionic, it is associated with both negative and positive counterions, for example, Cl$^-$ and Na$^+$ or K$^+$. Viscoelastic surfactant has been described in U.S. Pat. Nos. 7,081,439 and 7,279,446.

Weighting agents are high-specific gravity and finely divided solid materials used to increase density, for example silica flour, fly ash, calcium carbonate, barite, hematite, ilemite, siderite, and the like.

The segregating fluid can be a liquid or a foam. The carrier fluid can be foamed with a liquid hydrocarbon or a gas or liquefied gas such as nitrogen or carbon dioxide. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts and alkyl amido amine quaternary ammonium salts. Foam system is mainly used in fracturing low pressure or water sensitive formations.

Lubricants minimize friction and include materials such as a polyacrylamide, petroleum distillate, hydrotreated light petroleum distillate, a short chain alcohol (e.g., methanol), or polyol (e.g., ethylene glycol or glycerol polyisobutyl methacrylate, polymethyl methacrylate, polyisobutylene, guar, guar derivatives, a polysaccharide such as cellulose and starch, and polyethylene oxide, or a combination comprising at least one of the foregoing can be used.

Fluid-loss control agents are usually water-soluble polymers such as guar gums, poly(ethyleneimine, cellulose derivatives, and polystyrene sulfonate. In some embodiments the same polymer functions as both a viscosifier and a fluid-loss control agent.

The clay stabilizer prevents the clay downhole from swelling under contact with the segregating fluid or applied fracturing pressure and can be, for example, a quaternary amine, a brine (e.g., KCl brine), choline chloride, tetramethyl ammonium chloride, and the like.

A biocide prevents injection of a microbe (e.g., bacteria) downhole by eliminating or reducing bacteria in the segregating fluid, thus reducing production of, e.g., sour gas. Examples of biocides include aldehydes such as glutaraldehyde, oxidizing biocides such as hypochlorite bleach (e.g., calcium hypochlorite and lithium hypochlorite), peracetic acid, potassium monopersulfate, potassium peroxymonosulfate, bromochlorodimethylhydantoin, dichloroethylmethylhydantoin, chloroisocyanurate, trichloroisocyanuric acids, dichloroisocyanuric acids, chlorinated hydantoins, and the like, stabilized sodium hypobromite, activated sodium bromide, brominated hydantoins, chlorine dioxide, ozone, inorganic persulfates such as ammonium persulfate, or peroxides, such as hydrogen peroxide, and organic peroxides, and non-oxidizing biocides such as dibromonitfilopropionamide, thiocyanomethylthiobenzothlazole, methyldithiocarbamate, tetrahydrodimethylthladiazonethione, tributyltin oxide, bromonitropropanediol, bromonitrostyrene, methylene bisthiocyanate, chloromethylisothlazolone, methylisothiazolone, benzisothlazolone, dodecylguanidine hydrochloride, polyhexamethylene biguanide, tetrakis(hydroxymethyl) phosphonium sulfate, glutaraldehyde, alkyldimethylbenzyl ammonium chloride, didecyldimethylammonium chloride, poly[oxyethylene-(dimethyliminio) ethylene (dimethyliminio) ethylene dichloride], decylthioethanamine, terbuthylazine, quaternary ammonium salts (e.g., having a fatty alkyl group and three methyl groups), and quaternary phosphonium salts having methyl groups, hydroxymethyl groups or aryl groups. Specific examples of biocides include formaldehyde, glyoxal, furfural, acrolein, methacrolein, propionaldehyde, acetaldehyde, crotonaldehyde, pyridinium biocides, benzalkonium chloride, cetrimide, cetyl trimethyl ammonium chloride, benzethonium chloride, cetylpyridinium chloride, chlorphenoctium amsonate, dequalinium acetate, dequalinium chloride, domiphen bromide, laurolinium acetate, methylbenzethonium chloride, myristyl-gamma-picolinium chloride, ortaphonium chloride, triclobisonium chloride, alkyl dimethyl benzyl ammonium chloride, cocodiamine, dazomet, 1-(3-chloroallyl)-chloride.3,5,7-triaza-1-azoniaadamantane, or a combination comprising at least one of the foregoing can be used. In an embodiment, the biocide is encapsulated or coated.

The various properties of the segregating fluids can be varied and can be adjusted according to well control and compatibility parameters of the particular drilling fluid, cement slurry, or other fluid being segregated. For example, the viscosity of the segregating fluid can be varied over a wide range such as an apparent viscosity (AV) from about 0.9 to about 200 about 5 centiPoise (cP). Although a low viscosity segregating fluid can be used, in many embodiments it is not necessary to use a segregating fluid having a low viscosity to displace a fluid such as a drilling mud. Without being bound by theory, it is believed that this feature is unique, in that the displacement efficiency is linked to the particle packing methodology enabled by use of the swellable polymers.

Similarly, the density of the segregating fluid can vary over a wide range. In contrast to the prior art, where a spacer fluid would be heavier (denser) than the preceding fluid (e.g., a 12 ppg mud and then a 14 ppg spacer and then a 16 ppg cement), the segregating fluids described herein can have the same, lower, or higher density than the first and second fluids. Again without being bound by theory, the particle packing arrangement of the segregating fluids described herein displace the preceding fluid without having to be thinner, or heavier than the fluid before it. In some embodiments, where there is a density mismatch between the drilling fluid and the cement slurry, the segregating fluid is densified such that it is intermediate between that of the drilling fluid and the cement slurry. Additionally, the density of the segregating fluid can be graduated to better match the densities of the fluids between which it is interposed. For turbulent flow, the density of the segregating fluid can be about 10 pounds per thousand gallon (ppt) using traditional densification methodologies (e.g., saturated NaCl brine).

In a method of segregating a first fluid from a second fluid in a wellbore during cementing, a first fluid is injecting into the wellbore; the segregating fluid is injected into the wellbore to contact the first fluid; and a second fluid is injected into the wellbore to contact the segregating fluid. The segregating fluid prevents substantial mixing of the first fluid with the second fluid, and preferably the segregating fluid prevents any mixing of the first fluid and the second fluid.

The first fluid and the second fluid can be the same or different. The first and second fluid can be a drilling fluid, a spacer fluid, a cement slurry, or a combination thereof Generally the first fluid and the second fluid are different, and can have a different composition or a different property such as viscosity or density. For example, the first fluid can be a drilling fluid and the second fluid a spacer fluid, a scavenger cement slurry, or a cement slurry. The first fluid can be a spacer fluid and the second fluid a different spacer fluid or a cement slurry. In an embodiment, the segregating fluid flocculates a solid in the first fluid, particularly in a drilling fluid.

The segregating fluid can be premixed or is injected without mixing, e.g., injected "on the fly" where the components are combined as the segregating fluid is being injected downhole. The order of addition can be varied and the time of injecting each is the same or different.

In some embodiments two segregating fluids or pills are used sequentially. The first and second segregating fluids can the same or different with respect to composition or properties. For example, the first segregating fluid can be a weighted drive spacer that contains one or more weighting agents, and the second segregating fluid can be turbulent flow fluid for removing any remaining drilling fluid and thoroughly cleaning the outside of the casing and the inside of the drilled hole so that the cement can establish a sufficient bond whereby the annular space is then sealed.

Another embodiment is a method of removing an aqueous drilling fluid from a wellbore containing the aqueous drilling fluid, comprising injecting into the wellbore the segregating fluid to contact the aqueous drilling fluid and to flocculate a solid in the aqueous drilling fluid; and removing the flocculated aqueous drilling fluid from the wellbore. The flocculated aqueous drilling fluid can be a colloidal suspension, preferably a granular colloidal suspension.

Use of the segregating fluids provides a number of benefits. The fluids are stable at high wellbore temperatures, for example up to about 350° F. In some embodiments, the fluids are stable at about 80 to about 350° F., or about 80 to about 250° F. The fluids can be used in horizontal or vertical wellbores. The segregating fluids are compatible with both drilling fluid and the cement slurries that they are used in conjunction with. Optionally, the segregating fluids can be formulated to possess desired rheological properties, such as turbulent flow at lower shear rates, which assist in granular solids removal and which encourage the removal of the drilling fluid filter cake from the walls of the well.

The methods and compositions further have the advantages of improved cementing, by reducing the amount of drilling fluids, contaminant particles, and other debris before introducing the cement slurry. It will be appreciated that it is not necessary for all of the drilling fluids or all of the contaminant particles to be removed for the method and its compositions to be considered successful. Success is obtained if more drilling fluids such as drilling muds, particles and other contamination are removed using the segregating fluid than if it is not used. In general, of course, it is desirable to remove as much of the drilling fluids, mud, contamination and debris as possible.

All ranges disclosed herein are inclusive of the endpoints, and the endpoints are independently combinable with each other. The ranges are continuous and thus contain every value and subset comprising at least one of the foregoing in the range. As used herein, "combination" is inclusive of blends, mixtures, alloys, reaction products, and the like. The term "(meth)acryl" is inclusive of both acryl and methacryl. As used herein, "a combination comprising at least one of the foregoing" refers to a combination comprising at least one of the named constituents, components, compounds, or elements, optionally with a like component, compound, or element not named. The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. Embodiments herein can be used independently or can be combined.

All references are incorporated herein by reference.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

The invention claimed is:

1. A method of segregating a first fluid from a second fluid in a wellbore during cementing, the method comprising:
   injecting into the wellbore the first fluid;
   injecting into the wellbore a segregating fluid to contact the first fluid, wherein the segregating fluid flocculates a solid in the first fluid; and
   injecting into the wellbore the second fluid to contact the segregating fluid,
   wherein the segregating fluid comprises an aqueous segregating carrier fluid and a preformed synthetic polymer swellable in the aqueous segregating carrier fluid in an amount effective to segregate the first fluid from the second fluid in the wellbore,
   the preformed synthetic polymer comprising:
   a copolymer of (meth)acrylamide with one or more of the following: maleic anhydride; ethylene glycol; or acrylonitrile;
   poly(acrylamide) having crosslinks derived from polyethylene glycol diacrylate;
   poly(acrylic acid) having crosslinks derived from a vinyl ester oligomer;
   a poly(acrylic acid) partial sodium salt-graft-poly(ethylene glycol); or
   a copolymer of acrylic acid and a salt thereof having crosslinks derived from polyethylene glycol diacrylate; and
   the preformed synthetic polymer being present in the aqueous segregating carrier fluid in a concentration of about 10 to about 100 pounds per thousand gallons of the aqueous segregaing carrier fluid.

2. The method of claim 1, wherein the first fluid is the same as the second fluid, or the first fluid differs from the second fluid.

3. The method of claim 1, wherein the segregating fluid prevents substantial mixing of the first fluid with the second fluid.

4. The method of claim 1, wherein the first fluid and the second fluid are the same or different, and are a drilling fluid, a spacer fluid, a scavenger cement slurry, or a cement slurry.

5. The method of claim 1, wherein the first fluid is a drilling fluid and the second fluid is a spacer fluid or a cement slurry.

6. The method of claim 1, wherein the first fluid is a spacer fluid and the second fluid is a spacer fluid or a cement slurry.

7. The method of claim 1, wherein the segregating fluid prevents any mixing of the first fluid and the second fluid.

8. A method of removing an aqueous drilling fluid from a wellbore containing the aqueous drilling fluid, the method comprising:
   injecting into the wellbore a segregating fluid to contact the aqueous drilling fluid and to flocculate a solid in the aqueous drilling fluid; and
   removing the flocculated aqueous drilling fluid from the wellbore,
   wherein the segregating fluid comprises an aqueous segregating carrier fluid and a preformed synthetic polymer swellable in the aqueous segregating carrier fluid in an amount effective to segregate a first fluid from a second fluid in a wellbore,
   the preformed synthetic polymer comprising:
   a copolymer of (meth)acrylamide with one or more of the following: maleic anhydride; ethylene glycol; or acrylonitrile;
   poly(acrylamide) having crosslinks derived from polyethylene glycol diacrylate;
   poly(acrylic acid) having crosslinks derived from a vinyl ester oligomer;
   a poly(acrylic acid) partial sodium salt-graft-poly(ethylene glycol); or
   a copolymer of acrylic acid and a salt thereof having crosslinks derived from polyethylene glycol diacrylatel; and
   the preformed synthetic polymer being present in the aqueous segregating carrier fluid in a concentration of about 10 to about 100 pounds per thousand gallons of the aqueous segregaing carrier fluid.

9. The method of claim 8, wherein the flocculated aqueous drilling fluid is a colloidal suspension.

10. The method of claim 1, wherein the wellbore is a vertical or a horizontal wellbore.

11. The method of claim 1, wherein the preformed synthetic polymer is present in the form of particles comprising the polymer.

12. The method of claim 11, wherein the particles are swelled and at least 50% of the polymer particles have an average largest diameter of about 500 to about 12,000 micrometers.

13. The method of claim 1, wherein the preformed synthetic polymer is present in the carrier fluid in a concentration of about 1 to about 75 pounds per thousand gallons of the carrier fluid.

14. The method of claim 11, wherein preformed synthetic polymer has internal crosslinks but no surface crosslinks.

15. The method of claim 11, wherein the particles further comprise a swellable natural polymer.

16. The method of claim 11, wherein the segregating fluid is a foam; and the carrier fluid is foamed with a liquid hydrocarbon, a gas or liquefied gas, or a nongaseous foaming agent.

17. The method of claim 11, wherein the segregating fluid has a same or lower density than the first and second fluids.

18. The method of claim 11, wherein the first fluid is a drilling fluid and the second fluid is a cement slurry, and the segregating fluid has a density that is higher than the first fluid but lower than the second fluid.

19. The method of claim 1, further comprising allowing the synthetic polymer to swell and agglomerate in the aqueous segregating carrier fluid forming a hydrated pack of swelled synthetic polymer.

\* \* \* \* \*